(12) United States Patent
McInerney

(10) Patent No.: US 6,902,209 B2
(45) Date of Patent: Jun. 7, 2005

(54) GREASE GUN ADAPTOR DEVICE

(76) Inventor: Edward A. McInerney, 595 Periwinkle Dr., Roswell, GA (US) 30075

( * ) Notice: Subject to any disclaimer, the term of this patent is extended or adjusted under 35 U.S.C. 154(b) by 149 days.

(21) Appl. No.: 10/222,293

(22) Filed: Aug. 15, 2002

(65) Prior Publication Data

US 2004/0031812 A1 Feb. 19, 2004

(51) Int. Cl.$^7$ ............................................. F16L 25/00
(52) U.S. Cl. ......................... 285/384; 285/12; 285/353
(58) Field of Search ................................. 285/384, 353, 285/12

(56) References Cited

U.S. PATENT DOCUMENTS

| | | | |
|---|---|---|---|
| 1,365,986 A | * | 1/1921 | Gullborg ..................... 285/101 |
| 1,366,381 A | * | 1/1921 | Gullborg et al. ............. 285/101 |
| 1,637,908 A | * | 8/1927 | Charles ......................... 285/87 |
| 1,799,279 A | * | 4/1931 | Butler .......................... 141/385 |
| 1,799,433 A | | 4/1931 | Murphy |
| 1,806,278 A | * | 5/1931 | Boker .......................... 285/375 |
| 1,958,216 A | * | 5/1934 | Tear ............................. 285/261 |
| 1,977,847 A | * | 10/1934 | Gentle ......................... 285/322 |
| 1,993,878 A | * | 3/1935 | Dodge ......................... 285/102 |
| 2,362,880 A | * | 11/1944 | Campbell ................. 184/105.1 |
| 2,400,817 A | * | 5/1946 | Fox et al. .................... 285/102 |
| 2,562,294 A | | 7/1951 | Cahenzli, Jr. |
| 2,702,201 A | | 2/1955 | Romanelli et al. |
| 2,704,678 A | * | 3/1955 | Klein et al. .................. 285/261 |
| 2,764,769 A | * | 10/1956 | Neuman ..................... 285/322 |
| 3,180,533 A | * | 4/1965 | Sundholm ................... 285/261 |
| 3,589,470 A | | 6/1971 | Dorn |
| 3,669,220 A | | 6/1972 | Andersson |
| 4,173,363 A | | 11/1979 | Stearns |
| 4,195,812 A | | 4/1980 | Norcross |
| 4,508,372 A | * | 4/1985 | White .................... 285/148.15 |
| 4,516,796 A | * | 5/1985 | Hudson .................... 423/578.4 |
| 4,567,925 A | | 2/1986 | Broussard |
| 4,619,298 A | * | 10/1986 | Broussard ................... 141/384 |
| 4,679,824 A | * | 7/1987 | Rodriguez et al. ............ 285/27 |
| 4,863,202 A | * | 9/1989 | Oldford ....................... 285/321 |
| 5,028,077 A | | 7/1991 | Hurst |
| 5,038,892 A | | 8/1991 | Maloney |
| 5,104,013 A | | 4/1992 | Hawley |
| 5,429,209 A | | 7/1995 | Shimabuku |
| 5,868,224 A | | 2/1999 | DiCarlo |
| 5,921,580 A | | 7/1999 | Dyer |
| 6,035,969 A | * | 3/2000 | Pyle ........................... 285/325 |
| 6,279,683 B1 | | 8/2001 | Peachey |
| 6,485,064 B1 | * | 11/2002 | Davidson .................... 285/353 |

* cited by examiner

Primary Examiner—David Bochna
(74) Attorney, Agent, or Firm—Myers & Kaplan, LLC; Sandra M. Sovinski, Esq.; Joel D. Myers, Esq.

(57) ABSTRACT

An improved grease gun adaptor device, wherein cost efficient refills for a standard grease gun can be utilized to lubricate equipment and tools having grease fittings that heretofore have required the purchase of brand specific tubes of grease, wherein a flexible design and cap screw enable easy, single-handed attachment to virtually any location of grease-fitting aperture, and wherein a simple one-piece design enables cost efficient production and utilization thereof. The present invention is particularly suited for, although not limited to, enabling a user to adapt the tip of a standard grease gun to a specified grease fitting to lubricate landscaping equipment and power tools, thereby eliminating the need to purchase a brand specific tube of grease.

9 Claims, 4 Drawing Sheets

GREASE GUN ADAPTOR DEVICE

TECHNICAL FIELD

The present invention relates generally to grease applicator devices and, more specifically, to an improved grease gun adaptor device, wherein cost efficient refills for a standard grease gun can be utilized to lubricate equipment and tools having grease fittings that heretofore have required the purchase of brand specific tubes of grease. The present invention is particularly suited for, although not limited to, enabling a user to adapt the tip of a standard grease gun to a specified grease-fitting aperture to lubricate landscaping equipment and power tools, thereby eliminating the need to purchase a brand specific tube of grease.

BACKGROUND OF THE INVENTION

Landscaping equipment and power tools must be lubricated regularly to maximize operational capacity and extend motor/gear lifespan. Fittings are typically provided on the motor case, wherein grease can be applied therethrough to lubricate the gears. However, most manufacturers have a generally unique selected diameter for the threaded grease fitting apertures of their brand of equipment. Unfortunately, standard grease guns do not fit the majority of these apertures.

Such lack of commonality, e.g. the specifically sized fittings, each manufacturer to market a tube of lubricating grease having a male delivery tip specifically sized to mate with the grease fitting aperture of it's brand of equipment. This disadvantageously necessitates the purchase of a particular tube of grease for each type of equipment utilized.

Previous devices have been described whereby a plurality of cooperative units may be linked together to enable utilization of a standard grease gun for lubrication of lawn equipment. However, in view of the simple versatility of the present invention, these devices are disadvantageous in that they not only require a user to keep track of a plurality of small parts, but exhibit a structural rigidity that prevents easy attachment to hard-to-access grease fittings.

Therefore, it is readily apparent that there is a need for an improved grease gun adaptor device, wherein a simply and economically constructed, flexible, one-piece adaptor is provided to enable quick and easy attachment to a grease fitting for lubrication of virtually any type of equipment or tool, thereby enabling the utilization of cost efficient grease gun refills, thus preventing the above-discussed disadvantages.

BRIEF SUMMARY OF THE INVENTION

Briefly described, in a preferred embodiment, the present invention overcomes the above-mentioned disadvantages and meets the recognized need for such a device by providing an improved grease gun adaptor device, wherein a flexible design enables easy attachment to virtually any grease fitting, wherein a simple one-piece design enables cost efficient production and utilization thereof, and wherein the adaptive function enables the utilization of economical grease refills for lubrication of equipment.

According to its major aspects and broadly stated, the present invention is an improved grease gun adaptor device, wherein a simple, versatile and flexible adaptor having a threaded male equipment connector, a preferably threaded male grease gun tip connector and a cap screw enable single-handedly efficient installation of the device without rotation of the grease gun, whereby the subsequent transfer of lubricating grease is enabled.

More specifically, the present invention is an improved grease gun adaptor device having a flexible linking means preferably positioned between two adaptive ends and having a cap screw preferably provided to enable tightening of at least one adaptive end of the device without necessitating rotation of the entire device. Preferably, the first adaptive end has a threaded male diameter specifically selected to mate with a female grease fitting receptacle on a particular brand of lawn equipment such as, for exemplary purposes only, STIHL, ECHO, REDMAX and/or RYOBI. The preferred cap screw is provided proximate to the first adaptive end, whereby the grease gun adaptor device may be tightly and removably connected to the unit to be lubricated. Preferably, the second adaptive end has a threaded male diameter specifically selected to mate with the female tip of a standard grease gun, wherein a second cap screw is preferably proximately provided for easy tightening thereof. To enable adaptation of grease gun tips having ball valve receptacles in lieu of female threaded apertures, a second embodiment wherein the second adaptive end is a ball valve is provided.

A feature and advantage of the present invention is the ability of such a device to enable easy adaptation of a standard grease gun to a lubrication port on a piece of motorized equipment.

Another feature and advantage of the present invention is the ability of such a device to enable economically efficient lubrication of equipment.

Another feature and advantage of the present invention is the ability of such a device to eliminate the need to purchase multiple tubes of manufacturer specific grease, thus alleviating costly expenditures.

Another feature and advantage of the present invention is the ability of such a device to enable a user to utilize one standard tube of grease to refill a variety of motorized tools and equipment.

Another feature and advantage of the present invention is the ability of such a device to minimize operational costs associated with lawn equipment and other tools.

Another feature and advantage of the present invention is the ability of such a device to enable the transfer of grease from a standard grease gun into a motor/gear casing without necessitating the connection of a plurality of parts.

Another feature and advantage of the present invention is the ability of such a device is to facilitate adaptation to any grease fitting, irrespective of location, by providing an elongated, flexible transfer hose.

Another feature and advantage of the present invention is the ability of such a device to enable efficient single-handed connection between a grease gun and motor.

Another feature and advantage of the present invention is the ability of such a cost efficient device, through its ease of use, to encourage regular lubrication of landscaping equipment and power tools, thereby maximizing operational capacity, extending motor/gear lifespan and increasing return on equipment expenditures.

Another feature and advantage of the present invention is the ability of such a simple one-piece device to enable cost efficient production.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATE EMBODIMENTS

In describing the preferred and alternate embodiments of the present invention, as illustrated in the figures and/or described herein, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
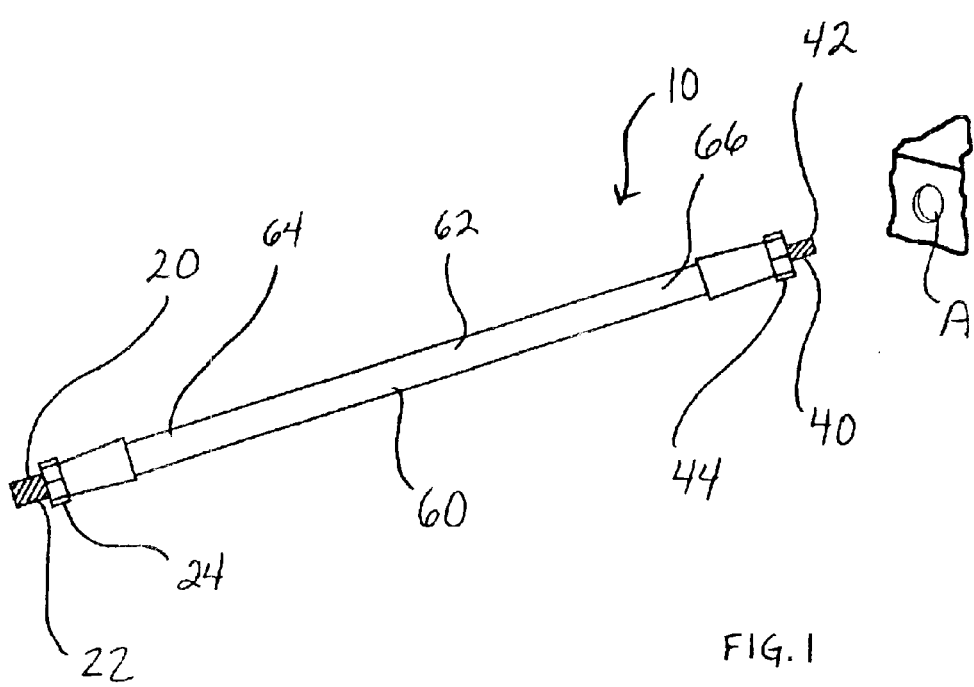
FIG. 1 is a perspective view of a grease gun adaptor apparatus according to a preferred embodiment of the present invention, showing the grease gun adaptor removed from a grease-fitting aperture.
Figure 2:
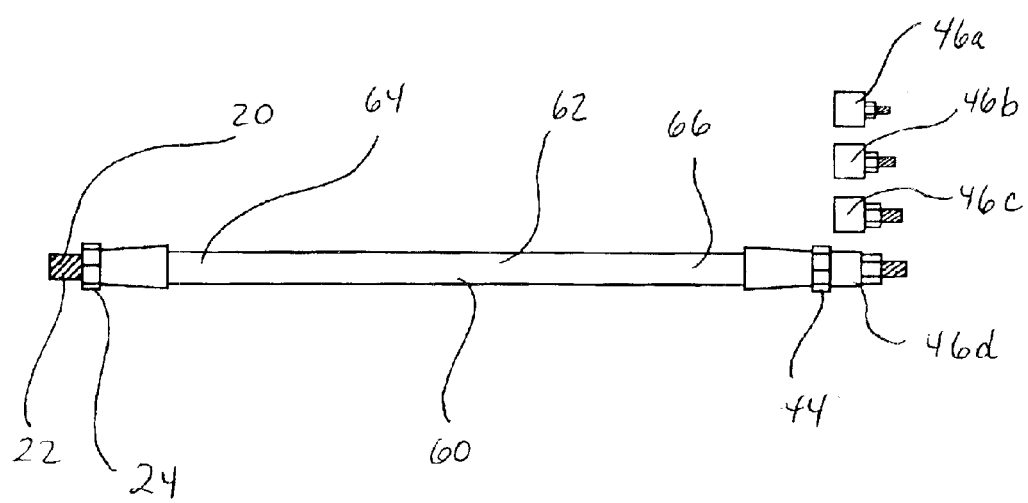
FIG. 2 is a side view of a grease gun adaptor apparatus according to an alternate embodiment of the present invention, showing a plurality of interchangeable adaptor tips.

Referring now to FIG. 1, the present invention is an improved grease gun adaptor device 10, wherein first coupling end 20 enables removable connection to a standard grease gun, wherein second coupling end 40 enables removable connection to a grease fitting aperture "A", and wherein linking means 60 enables grease received through first coupling end 20 to be transferred and released through second coupling end 40, thereby enabling lubrication of selected equipment having a grease fitting aperture "A" via preferred one-piece reducing coupler, grease gun adaptor device 10.

Preferably, first coupling end 20 is male threaded member 22, wherein preferably ⅛ inch pipe thread enables connection to a known female threaded receptacle provided on a standard grease gun. One skilled in the art would readily recognize that, while ⅛ inch pipe thread is preferable as the common connection to a standard grease gun, alternate thread size and spacing could be utilized to enable reception by non-standard grease guns. Preferably, cap screw 24 is provided, wherein rotation thereof enables secure placement of male threaded member 22 within a known female threaded receptacle of standard grease gun without requiring rotation of the grease gun or grease gun adaptor device 10. While male threaded member 22 is preferred for removably connecting first coupling end 20 of grease gun adaptor device 10 to a standard grease gun having a female threaded receptacle, in an alternate embodiment, first coupling end 20 of grease gun adaptor device 10 could carry ball valve 30, best seen in FIG. 4, to enable removable connection to a grease gun having a ball valve receptacle tip.

Preferably, second coupling end 40 is male threaded member 42, wherein specified reduction of diameter and thread spacing relative to male threaded member 22 of first coupling end 20 enables the adaptive coupling of two differently sized female threaded receptacles. Specifically, for instance, male threaded member 42 with ten-millimeter, 7/16 and/or ⅛-inch compression threading enables coupling of a standard grease gun to a known grease-fitting aperture of a piece of STIHL landscaping equipment for lubrication thereof without requiring the purchase of a brand specific tube of grease. Thus, male threaded member 42 may possess any necessary specified diameter and thread spacing in order to enable specific mating with a grease-fitting aperture for a particular brand of equipment. Preferably, cap screw 44 is provided, wherein rotation thereof enables secure placement of male threaded member 42 within a known grease-fitting aperture of any piece of equipment to be lubricated requiring rotation of the piece of equipment or grease gun adaptor device 10.

Linking means 60 is preferably elongated, flexible rubber tubing 62, whereby connection of grease gun adaptor device 10 for transferring lubricant from a grease gun to a piece of equipment is facilitated irrespective of the location of the grease fitting aperture. Preferably, flexible rubber tubing 62 is resists pressure induced failure at known grease gun working pressures such as, for exemplary purposes only, approximately 3,000 psi, and known burst pressures such as, for exemplary purposes only, approximately 12,000 psi.

Preferably, first end 64 of linking means 60 carries first coupling end 20, wherein first coupling end 20 is preferably crimpedly attached to elongated, flexible rubber tubing 62. Preferably, second end 66 of linking means 60 carries second coupling end 40, wherein second coupling end 40 is preferably crimpedly attached to elongated, flexible rubber tubing 62. Although crimping is the preferred method for attaching first coupling end 20 and second coupling end 40 to first end 64 and second end 66 of linking means 60, respectively, any means known in the art may be alternately utilized wherein the secure and pressure resistant transfer of grease through linking means 60 is enabled.

Figure 3:
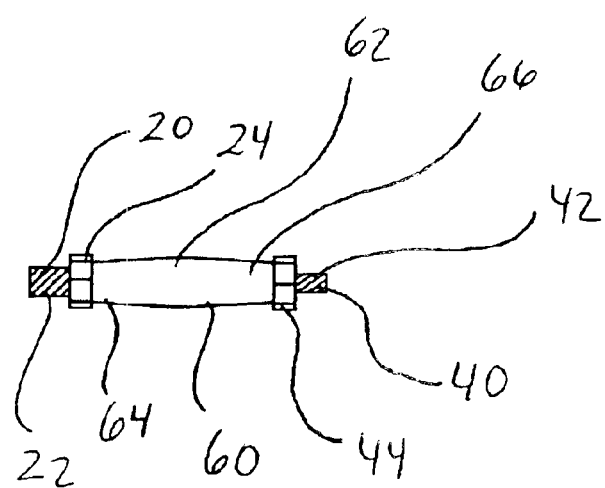
FIG. 3 is a side view of a grease gun adaptor apparatus according to an alternate embodiment of the present invention.

Although elongated, flexible rubber tubing is preferred for linking means 60, one skilled in the art would readily recognize that other linking means 60, as well as other lengths of linking means 60, could be utilized such as, for exemplary purposes only, metal tubing, as shown in FIG. 3, wherein grease gun adaptor device 10 could be less flexible.

In an alternate embodiment, grease gun adaptor device 10 could have only one cap screw, such as 44, wherein rotation of grease gun adaptor device 10 could enable removable placement of device 10 in a standard grease gun, and wherein rotation of only one cap screw 44 could enable removable securing of device 10 in a grease fitting aperture selected to receive lubrication.

Figure 4:
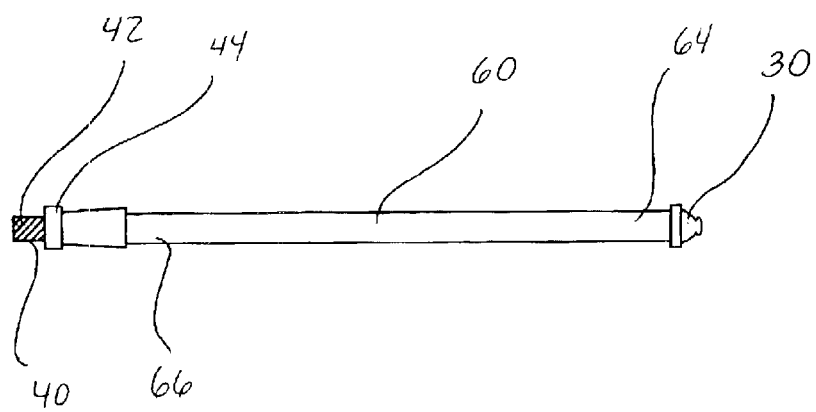
FIG. 4 is a side view of a grease gun adaptor apparatus according to an alternate embodiment of the present invention.

In another alternate embodiment, grease gun adaptor device 10 could carry ball valve 30 proximate to first coupling end 20, as best seen in FIG. 4, wherein direct hookup to a ball valve type receptacle grease gun tip could be enabled and the need for a cap screw could be eliminated.

In another alternate embodiment, grease gun adaptor device 10 could have a plurality of removable male threaded members 46a, 46b, 46c and 46d, wherein each male threaded member 46a, 46b, 46c or 46d could enable a specific reduction of diameter and thread spacing relative to male threaded member 22 of first coupling end 20 and could enable a different thread arrangement and size relative to the other male threaded members 46a, 46b, 46c or 46d, whereby selection of a first particular male threaded member 46a, 46b, 46c or 46d could enable a user to lubricate one brand of equipment, for instance ECHO, and whereby removal and replacement with a second particular male threaded member 46a, 46b, 46c or 46d could enable a user to lubricate another brand of equipment, for instance, REDMAX, without changing tubes of grease.

In an alternate embodiment, linking means 60 could be steel, copper, brass or any other appropriate type of tubing, wherein the overall length of device 10 could be minimized to maximize portability.

In an alternate embodiment, grease gun adaptor device 10 could be formed as one integral unit, wherein linking means 60, first coupling end 20 and second coupling end 40 could be defined by one piece of metal pipe having a varied circumference and opposing ends having different diameters and threading.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An improved grease gun adaptor device for connecting a grease gun with a piece of landscaping equipment and delivering lubrication therethrough, comprising:

a first coupling having a first male configuration for removably connecting to the grease gun;

a second coupling having a second male configuration for removably connecting to the piece of landscaping equipment, wherein said second coupling is a lubrication delivery nozzle;

a linking means having a hollow bore, a first end and a second end, wherein said first end carries said first coupling and said second end removably carries said second coupling;

at least one cap screw carried between said linking means and said second coupling, said at least one cap screw facilitating a threaded engagement of said second male configuration of said second coupling with the threaded female grease fitting of the piece of landscaping equipment; and at least a third coupling having a third male configuration for removably connecting to a second piece of landscaping equipment.

2. The improved grease gun adaptor device of claim 1, wherein said first male configuration for removably connecting to the grease gun is ⅛-inch pipe thread.

3. The improved grease gun adaptor device of claim 1, wherein said first male configuration for removably connecting to the grease gun is a ball valve.

4. The improved grease gun adaptor device of claim 1, wherein said second male configuration for removably linking to the piece of landscaping equipment is ten-millimeter threading.

5. The improved grease gun adaptor device of claim 1, wherein said second male configuration for removably linking to the piece of landscaping equipment is ⁷⁄₁₆ threading.

6. The improved grease gun adaptor device of claim 1, wherein said second male configuration for removably linking to the piece of landscaping equipment is ⅛-inch compression threading.

7. The improved grease gun adaptor device of claim 1, further comprising a second cap screw carried proximate to said second coupling.

8. The improved grease gun adaptor device of claim 1, wherein said linking means is pressure resistant rubber tubing.

9. The improved grease gun adaptor device of claim 1, wherein said linking means is metal tubing.

\* \* \* \* \*